United States Patent
Deitz-Bertke et al.

[11] Patent Number: 5,808,819
[45] Date of Patent: Sep. 15, 1998

[54] COMPUTER MONITOR ATTACHMENT FOR IMAGE MANIPULATION

[76] Inventors: Carol Lynn Deitz-Bertke, 3123 Hergott, Edgewood, Ky. 41017; Paul H. Sorg, 414 Morris Rd., Wright, Ky. 41011

[21] Appl. No.: 709,617

[22] Filed: Sep. 9, 1996

[51] Int. Cl.[6] .............................. G02B 5/08; G02B 7/182
[52] U.S. Cl. ........................................... 359/857; 359/871
[58] Field of Search ................................ 359/601, 602, 359/855, 856, 857, 858, 871

[56] References Cited

U.S. PATENT DOCUMENTS

| | | | |
|---|---|---|---|
| 1,733,869 | 10/1929 | Edward | 359/857 |
| 2,155,164 | 4/1939 | Harris | 359/857 |
| 2,635,506 | 4/1953 | Chaimson | 359/857 |
| 3,014,408 | 12/1961 | Miller, Jr. | 359/857 |
| 4,784,468 | 11/1988 | Tierney | 359/601 |
| 4,880,300 | 11/1989 | Payner et al. | 359/601 |
| 4,930,884 | 6/1990 | Tichenor et al. | 359/857 |
| 5,069,529 | 12/1991 | Takahashi | 359/601 |
| 5,121,253 | 6/1992 | Waintroob | 359/601 |
| 5,218,474 | 6/1993 | Kirschner | 359/601 |

*Primary Examiner*—Ricky D. Shafer
*Attorney, Agent, or Firm*—R. Christian Macke

[57] ABSTRACT

A computer monitor attachment with mirrors for reflecting and manipulating the image presented on the monitor. Two mirrors mounted in a housing, which is easily attached to and detached from the monitor, reflect the monitor image such that it is visible to a user at a lower level in a substantially horizontal orientation. The housing is constructed form a paperboard blank and is detachable and collapsible, facilitating transport from one monitor to another.

6 Claims, 3 Drawing Sheets

COMPUTER MONITOR ATTACHMENT FOR IMAGE MANIPULATION

TECHNICAL FIELD

This invention relates to a computer monitor attachment that reflects the images on a monitor to a position that is more easily viewed by a user.

BACKGROUND OF THE INVENTION

It has long been recognized that it is advantageous to provide an arrangement wherein an image from a computer monitor is presented from a low, substantially horizontal position such that an operator sitting at the desk will look downward to view the image as opposed to the more conventional desk top and typically higher, substantially vertical position. Such an arrangement allows the user to alternate between looking downward at documents laying flat on the desk and the monitor without requiring a lot of up and down head and neck movement. It also allows users who wear bifocals or reading glasses to look downwardly through their glasses without requiring an unnatural backward tilting of the head or adjustment of the glasses to view the image. Prior art approaches have provided arrangements wherein the entire monitor is positioned below and suspended from a desk top, a transparent surface being provided in the desk top through which the user can view the monitor. Such arrangements are shown in Schairbaum U.S. Pat. No. 5,410,972 and Schairbaum U.S. Pat. No. 4,590,866 and in McIntosh Canadian Pat. No. 1,106,895.

The prior art arrangements in relocating the monitor to a position under the desk top have several disadvantages. First, a monitor suspending assembly of sufficient bulk to support a computer monitor is affixed to the underside of the desk top to hold the monitor in place. Adjustment of the monitor suspending assembly for height and angle is necessary to accommodate different monitor sizes and user preferences.

The prior art approaches to relocating the image position require not only the addition of the bulky monitor suspending assembly, but also necessitate modification of a desk top to provide a partially transparent surface through which the monitor and image can be viewed. It is desirable to provide an arrangement wherein an image presented on a computer monitor is visible at a lower level in a substantially horizontal position, while not requiring the bulky and costly modifications or production of a large piece of furniture like a desk.

The presence below the desk of the prior art monitor suspending assembly, and of the monitor itself, is also disadvantageous because the leg room underneath the desk is occupied thereby. A user is required to sit back away from the desk, disadvantageously increasing the distance from the user's eyes to the location of the monitor's image. It is desirable to provide an arrangement wherein the monitor image is presented in a low, substantially horizontal position, the arrangement being designed such that it does not occupy the leg room under a desk and such that it does not increase the distance from the user's eyes to the image.

In addition to the foregoing, a monitor suspending assembly does not readily provide flexibility to switch the image position from the conventional desk top, substantially vertical orientation to the substantially horizontal orientation and position below the desk top. Installation or removal of the monitor, as well as the monitor suspending assembly, is difficult and time consuming and requires awkward equipment manipulation under the desk. Such installation or removal is not readily undertaken by the user. Instead, a technician will be required to install or remove a monitor from its position below the desk. As such, the prior art monitor suspending assemblies are typically utilized exclusively to provide below desk monitor positions which provide substantially horizontal images. This lack of flexibility is disadvantageous in the situation wherein multiple users operate a computer and utilize the monitor, it being recognized that some users prefer to work with the conventional vertical image while others prefer the horizontal image. It is desirable to provide an arrangement that is readily adaptable to provide either a vertical image or a lower substantially horizontal image. A flexible arrangement not requiring relocation of the monitor itself is preferred.

To accommodate users that prefer the lower, substantially horizontal image, it is desirable to provide an arrangement whereby the image from a conventional desk top monitor with a substantially vertical image is easily manipulated to provide a lower, substantially horizontal image. An attachment to the monitor which provides the desired image manipulations and which is readily attached to and detached from the monitor is preferred. In addition, such an attachment that is lightweight and portable makes it possible to quickly convert a conventional, vertical image monitor to provide a lower, horizontal image by merely applying the attachment to the monitor.

The present invention provides a computer monitor attachment addressing the above problems.

SUMMARY OF THE INVENTION

This invention addresses and overcomes the various drawbacks of prior art attempts to provide a lower substantially horizontal image from a computer monitor.

It is an object of the present invention to provide a computer monitor attachment that manipulates the image from substantially vertical to substantially horizontal.

It is another object to provide a computer monitor attachment providing for a lower, substantially horizontal image from a computer without interfering with leg room under the desk. The attachment is designed such that the distance from a user's eyes to the horizontal image is not increased.

It is yet another object to provide a computer monitor attachment that is easily attached and detached to provide an arrangement wherein orientation of the image viewed is easily changed from vertical to horizontal and vice versa.

It is another object of the present invention to provide a computer assembly wherein a detachable housing makes it possible to present an image either vertically or horizontally.

It is a further object of the present invention to provide a lightweight and computer monitor attachment providing a lower, substantially horizontal image such that the attachment can be readily transferred from one monitor to another.

In the present invention, dual mirrors mounted in a housing reflect an image from a substantially vertically oriented monitor such that a substantially horizontal reflected image results. The housing includes quick connect means for attachment and detachment to the monitor.

The top mirror is fixedly mounted to the top panel of the housing while the bottom mirror is removably mounted on the bottom panels of the housing. The housing is lightweight and portable, folding over onto itself when not in use.

DESCRIPTION OF THE PREFERRED EMBODIMENT

Figure 1:
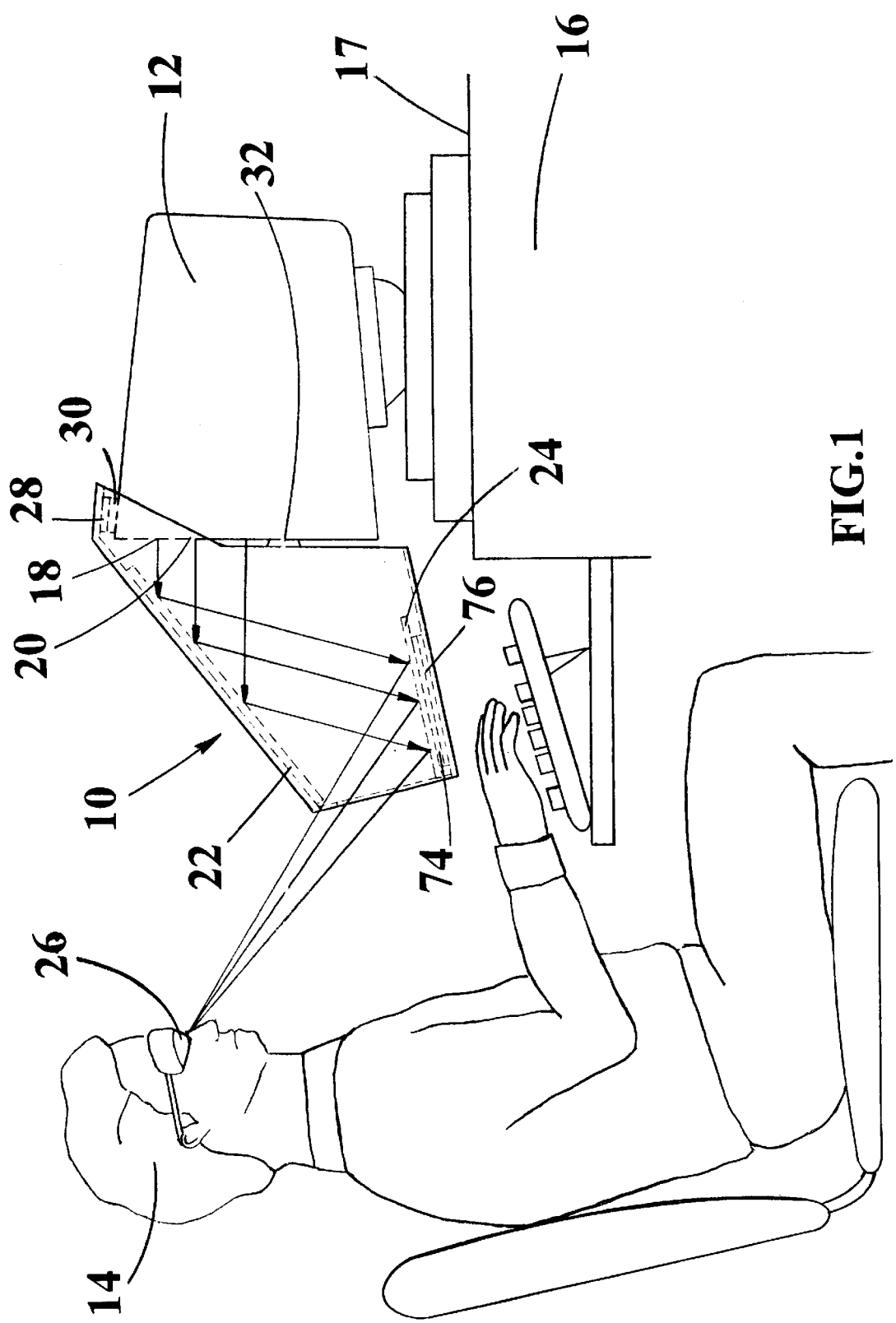
FIG. 1 is a side view depicting use of the present invention with a computer monitor.

Referring to FIG. 1 there is seen a depiction of a housing 10 affixed to a computer monitor 12. A user 14 sits at a desk 16 in a typical posture wherein the monitor 12 rests on the desk top 17. The user 14 sits in a position and posture as if looking straight ahead at the substantially vertically oriented screen 18. An image 20 which is initially substantially vertical on the screen 18 radiates outwardly along directional lines as shown until it is reflected by a surface comprising an upper mirror 22 affixed to the housing 10. The image 20 then travels downwardly along the directional arrows until being reflected by a surface comprising a lower mirror 24 positioned in a substantially horizontal orientation. The lower, substantially horizontal mirror 24 and the image reflected therein are visible to the user 14. In FIG. 1 the user 14 is depicted wearing glasses and viewing the lower, substantially horizontal mirror 24 and image through the bottom lens 26 of his bifocals.

Velcro strips 28 affixed to the housing 10 are joined to Velcro strips 30 mounted on the monitor 12, providing means for attaching the housing 10 to the monitor 12 that are readily detachable. Gravity causes the housing 10 to rotate about the joined Velcro strips 28,30 until inwardly folded stop tabs 32,34 engage the monitor 12, thereby providing means for holding the housing in place. The stop tabs 32, 34 hold the housing 10 in a position such that the substantially vertical image 20 on the screen 18 is reflected by the upper mirror 22 and lower mirror 24 so as to be visible to the user 14.

Figure 2:
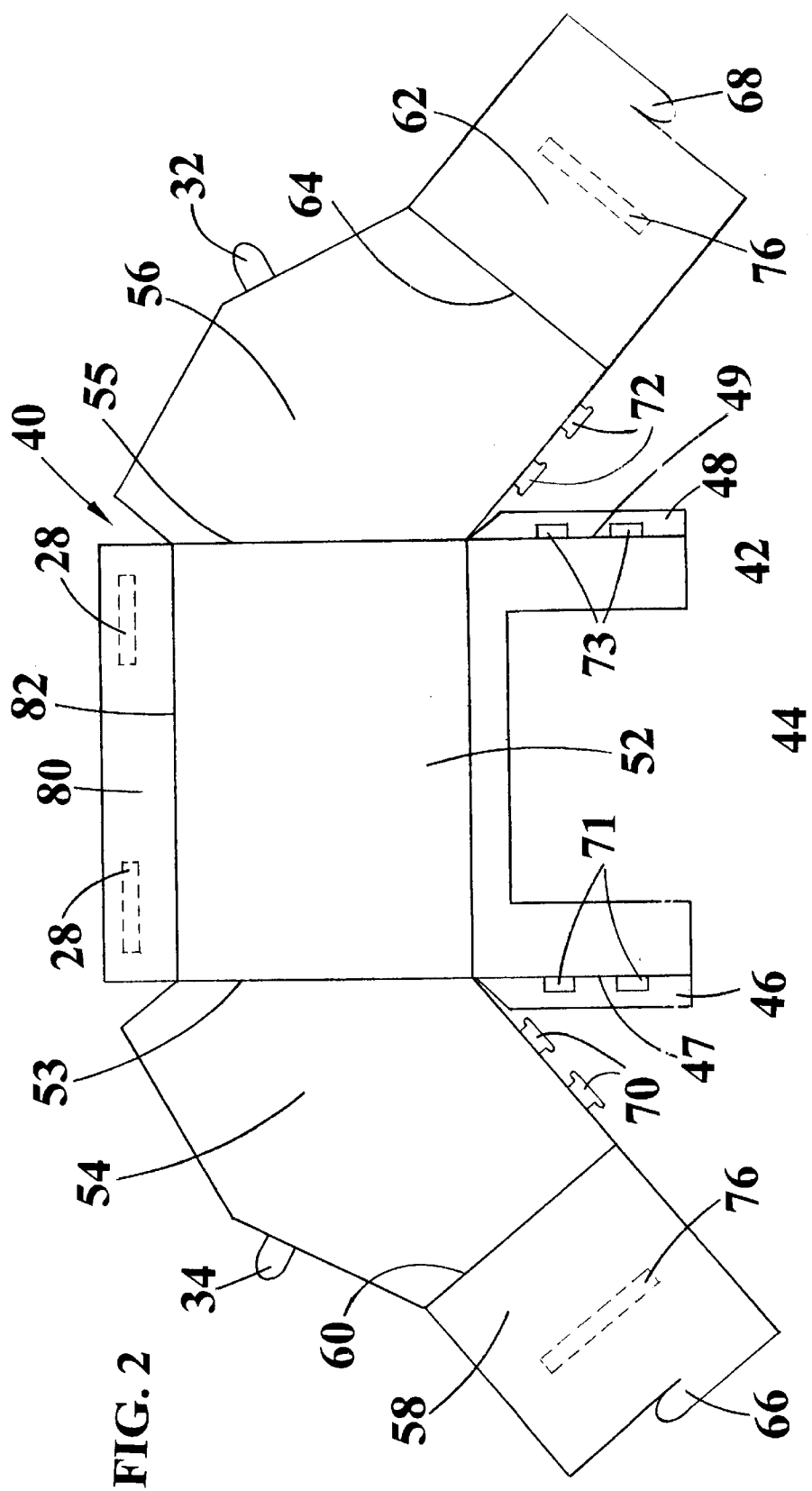
FIG. 2 is a top view of a paperboard blank folded to form the housing of the present invention.

The housing 10 is constructed from a paperboard blank 40 depicted in FIG. 2. The blank 40 includes a front panel 42 having an opening 44 through which the lower mirror 24 is visible to the user 14. A left extension 46, joined to the front panel 42 along fold line 47, and a right extension 48 joined along fold line 49, provide rigidity for the housing 10 in its constructed configuration (see FIG. 3). The blank 40 also includes a top panel 52 separated by fold line 53 from a left side panel 54. Similarly, the top panel 52 is separated by fold line 55 from right side panel 56. A left half bottom panel 58 is joined to left side panel 54 along fold line 60. Similarly, a right half bottom panel 62 is joined to right side panel 56 along fold line 64. Means for connecting the left half bottom panel 58 to the right half bottom panel 62 are provided by engaging a left tongue 66, affixed to the left half bottom panel 58, to a right tongue 68 affixed to right half bottom panel 62. Although this embodiment demonstrates joinder of the left half bottom panel 56 to the right half bottom panel 62 by using mated tongues 66, 68, other methods of joinder such as stitching and adhesive do not depart from the principles of the present invention.

Figure 3:
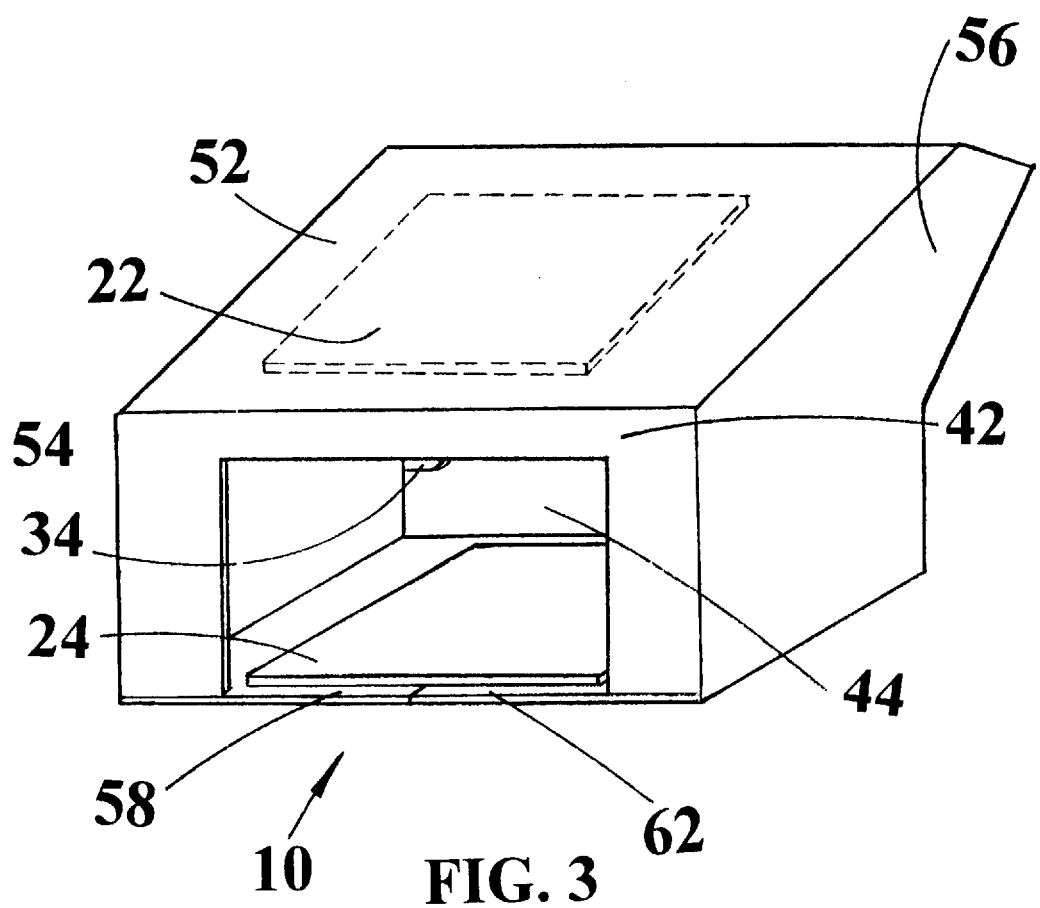
FIG. 3 is a perspective view of the housing of the present invention.

The blank 40 is constructed into the rigid housing 10 depicted in FIG. 3 by folding it and by interconnecting means between panels. Specifically, left tabs 70, which extend from an edge of the left side panel 54 adjacent the front panel 42, are received in slots 71 positioned on fold line 47. Also, right tabs 72, which extend from an edge of the right side panel 56 that is adjacent the front panel 42, are received in slots 73 positioned on fold line 49. The tabs 70,72 and slots 71,73 provide means for holding the housing 10 together in it constructed form and improves the rigidity thereof Although the preferred embodiment contemplates the use of tabs 70,72 and slots 71,73, other connecting means such as adhesive, Velcro, stitching, and other similar connecting means are contemplated and do not depart form the principles of the present invention.

FIG. 3 depicts the housing 10 of the present invention as constructed from the blank 40 shown in FIG. 2. Upper mirror 22 is shown affixed to the top panel 52. Similarly, lower mirror 24 is affixed across left half bottom panel 56 and right half bottom panel 62. Velcro strips 74 affixed to the underside of the lower mirror 24 match up to engage Velcro strips 76 that are affixed to the left half bottom panel 56 and right half bottom panel 62 as depicted in FIG. 2. Velcro strips 74, 76 provide releasable attachment means so that the lower mirror 24 can be removed.

The housing 10 is readily detachable from monitor 12 by separating at the Velcro strips 28, 30. The housing is collapsible by removing lower mirror 24, disengaging the mated tongues 66, 68, removing tabs 70,72 from slots 71,73, and folding the front panel 42 and either the right side panel 56 or left side panel 62 over onto itself to make the housing 10 an essentially flat configuration.

An overhang panel 80 is attached to top panel 52 along fold line 82. In the preferred embodiment, Velcro strips 28 are affixed to the overhang panel 80 as shown in FIG. 2 and the monitor 12 as shown in FIG. 1. The principles of the present invention recognize the use of other equivalent housing attaching means that make the housing 10 readily detachable such as adhesive, hooks, bolts and the like such that the use of such alternative housing attaching means does not diverge from the teaching of the present invention.

We claim:

1. A computer monitor attachment comprising:

a lightweight and portable housing;

quick connect means for attaching said housing to a computer monitor;

at least one reflective surface affixed to said housing, said at least one reflective surface positioned such that an image present on said monitor is reflected so as to be visible to a user; and means for holding said housing in place; wherein said housing comprises:

a top panel;

a right side panel;

a left side panel;

a left half bottom panel;

a right half bottom panel; and means for collapsing and folding said housing;

means for holding said housing together;

means for joining said left half bottom panel and said right half bottom panel; and means for folding at least one of said right side panel and said left side panel over to make the housing an essentially flat configuration.

2. The computer monitor attachment of claim 1 wherein said at least one reflective surface comprises an upper mirror affixed to said top panel and a lower mirror affixed to said left half bottom panel and said right half bottom panel and wherein said means for collapsing and folding further comprise means for releasably attaching said lower mirror to said left half bottom panel and said right half bottom panel.

3. The computer monitor attachment of claim 2 wherein said lower mirror releasable attachment means comprise Velcro strips affixed to an underside of said lower mirror and mated Velcro strips affixed to said left half bottom panel and said right half bottom panel.

4. The computer monitor attachment of claim 2 wherein said image is visible in said lower mirror and is positioned in a substantially horizontal orientation.

5. The computer monitor attachment of claim 4 wherein said quick connect attaching means comprise fastener strips affixed to an overhang panel affixed to said top panel and fastener strips mounted on the monitor; and said means for holding said housing in place comprise inwardly folded stop tabs engaging said monitor.

6. The computer monitor attachment of claim 5 wherein said means for holding said housing together comprise tabs removably engaging slots and wherein said means for joining said left half bottom panel and said right half bottom panel comprise disengagable mated tongues.

* * * * *